United States Patent [19]

Lovecky et al.

[11] Patent Number: 5,262,916

[45] Date of Patent: Nov. 16, 1993

[54] DUST DOOR INCORPORATING TAPE REEL LOCK

[75] Inventors: Craig Lovecky, Old Orchard Beach; Richard Rolfe, Biddleford, both of Me.

[73] Assignee: Shape Inc., Biddeford, Me.

[21] Appl. No.: 987,137

[22] Filed: Dec. 8, 1992

Related U.S. Application Data

[63] Continuation of Ser. No. 591,804, Oct. 2, 1990, abandoned.

[51] Int. Cl.$^5$ .............................................. G11B 23/087
[52] U.S. Cl. ............................................................ 360/132
[58] Field of Search ...................... 360/132; 242/198, 199

[56] References Cited

U.S. PATENT DOCUMENTS

| | | | |
|---|---|---|---|
| 3,900,172 | 8/1975 | Kamaya | 242/198 |
| 4,214,719 | 7/1980 | Kato | 242/198 |
| 4,225,100 | 9/1980 | Sugawara | 242/198 |
| 4,232,840 | 11/1980 | Sugawara | 242/198 |
| 4,304,331 | 12/1981 | Minkow | 206/387 |
| 4,322,000 | 3/1982 | Struble | 206/387 |
| 4,372,504 | 2/1983 | Shibata et al. | 242/198 |
| 4,447,020 | 5/1984 | Toi et al. | 242/198 |
| 4,572,461 | 2/1986 | Horikawa et al. | 242/198 |
| 4,728,056 | 3/1988 | Onmori et al. | 242/198 |
| 4,750,074 | 6/1988 | Oishi | 360/132 |
| 4,768,122 | 8/1988 | Kawada | 360/132 |
| 4,824,044 | 4/1989 | Oogi | 242/198 |
| 4,884,159 | 11/1989 | Satoh | 360/132 |

FOREIGN PATENT DOCUMENTS

| | | |
|---|---|---|
| 0140583 | 5/1985 | European Pat. Off. |
| 1450744 | 9/1976 | United Kingdom . |
| 2015477 | 9/1979 | United Kingdom . |
| 2019356 | 10/1979 | United Kingdom . |
| 2185960 | 8/1987 | United Kingdom . |
| 2239858 | 7/1991 | United Kingdom . |
| WO88/08196 | 10/1988 | World Int. Prop. O. . |

*Primary Examiner*—Robert S. Tupper
*Attorney, Agent, or Firm*—Staas & Halsey

[57] ABSTRACT

A pivotable spring load dust door movable between a first, closed position and a second, open position and including a pair of integrally formed projections. The projections extend, when the dust door is in the closed position, through openings formed in a front edge of the cassette cover and engage teeth formed on the circumference of the tape reel upper flanges.

8 Claims, 1 Drawing Sheet

DUST DOOR INCORPORATING TAPE REEL LOCK

This application is a continuation of application Ser. No. 07/591,804, filed Oct. 2, 1990, now abandoned.

BACKGROUND OF THE INVENTION

This invention relates to tape cassettes and, more particularly, to a tape reel lock formed on a video tape cassette dust door for preventing despooling of tape from the reels, when the cassette is not received by a tape player/recorder.

For convenience of reference, when describing the tape cassette herein, "inward" means in a direction toward to the interior of the cassette from its sides, "outward" means in a direction toward the sides of the cassette from the interior, and "downward" means in a direction toward the base from the cover.

A conventional tape cassette has a relatively flat, is substantially rectangular configuration, formed of a suitable plastic. The cassette includes a base and cover, each having side walls. Tape reels are usually suitably located in side-by-side relation within the cassette so as to be freely rotatable, and a magnetic tape is wound on the tape reels. A reel leaf spring is attached to the cassette cover to normally bias the tape reels downwardly.

These cassettes further include a pivotable, spring biased dust door which, when closed, protects the tape from dust, contact, etc. When the door is outwardly opened, usually by a tape player/recorder when the cassette is placed therein, the magnetic head of the player/recorder can gain access to the tape.

Video tape cassettes also include tape reel locks to prevent unwanted tape reel rotation which causes "despooling" of the tape during shipping, handling, etc. Despooled, tape, of course, can be damaged.

As a tape reel lock, the industry has almost uniformly adopted a multipiece reel lock, such as shown and described in U.S. Pat. Nos. 4,447,020 or 4,232,840. Such multipiece reel locks include a separate actuator/retractor, a pair of separate movable arms for respectively locking the reels, and a separate spring for biasing the arms toward the reels. These reel locks are assembled between the tape reels in walls/receptacles formed at the rear of the cassette base and are actuated by a pin of the tape player/recorder that protrudes through an opening formed at the rear of the base, when the player/recorder is operated.

Of course, such a multipiece lock is expensive to produce and assemble. Further, due to the number of parts and the fabrication requirements for each part, production yields cannot be maximized. Finally, there is always the chance that the parts, such as the spring, could become misaligned during shipping, handling or use, and fail to properly operate.

Assignee's currently pending U.S. Pat. application Ser. No. 389,906, now U.S. Pat. No. 5,056,735, entitled "Video Cassette Integral Actuator/Reel Lock Spring" provides an improved one-piece, biased reel lock to replace the conventional multipiece reel lock, significantly decreasing manufacturing and assembly costs.

There is also known a sliding locking member for certain audio cassettes, such as described in U.S. Pat. No. 4,728,056. More particularly, a substantially planar locking member is spring biased for normally urging protrusions formed inwardly thereon against the tape reel hubs. When the cassette is placed in a tape player/recorder, the locking member is retracted by the tape player/recorder, to remove the protrusions from engagement with the hubs and allow the hubs to rotate.

This type of device also suffers from manufacturing inefficiencies since the locking member must be spring loaded. Further, this type of device may be applicable only to a cassette used in a pulse code modulation system, as described in the '056 patent. Finally, the size, shape and sliding movement of the locking member do not provide much design flexibility for tape cassettes.

As can be seen, the art still is in need of a reel lock which needs no assembly and requires no moving parts or springs, to further simplify structure, improve quality and reliability, and minimize costs.

SUMMARY OF THE INVENTION

Accordingly, it is a purpose of the present invention to provide a tape cassette which can be made at less cost.

It is another purpose of the present invention to provide a tape cassette requiring fewer parts than conventional tape cassettes.

It is another purpose of the present invention to provide a reel lock requiring no assembly of parts into a video cassette or separate biased mounting.

It is another purpose of the present invention to provide a reel lock which is incorporated with another member already existing in the tape cassette for another purpose.

It is another purpose of the present invention to provide a video cassette reel lock which lacks moving or working parts, except cooperation between the reels and the dust door, to improve reliability.

Finally, it is a purpose of the present invention to provide a reel lock projecting inwardly from the dust door to cooperate with the tape reels and thereby prevent despooling of the tape, when the cassette is not received by the tape player/recorder.

To achieve the foregoing and other purposes of the present invention, and in accordance with the purposes of the invention there is provided a pivotable, spring-biased dust door movable between a first, closed position and a second, open position. The dust door has formed inwardly thereon a pair of spaced projections. The projections extend, when the dust door is in the second, closed position, through corresponding openings formed in a front edge of the cassette cover and engage teeth formed on the circumference of each tape reel upper flange. When the dust door is moved from the first, closed position to the second, open position, the projections disengage from the tape reel flanges, thereby allowing the tape reels to rotate freely for operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described with reference to FIGS. 1-3.

Figure 1:
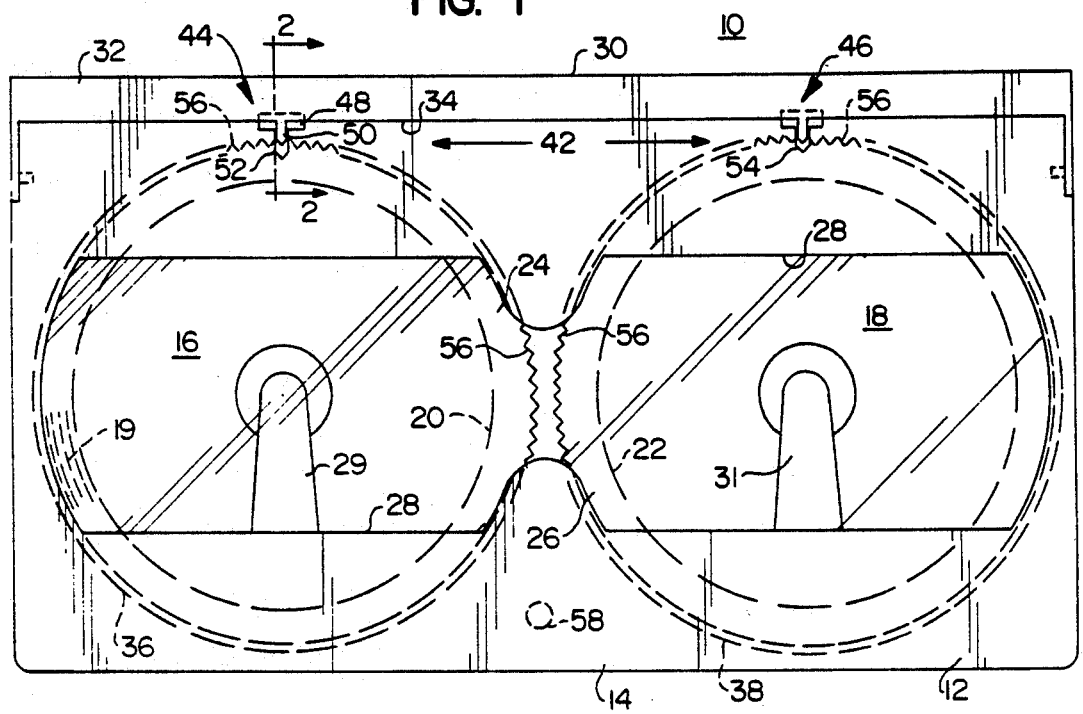
FIG. 1 is a top view of the tape cassette according to the present invention illustrating reel locks which are formed on the dust door and engaged with the tape reel flanges.

Shown in FIG. 1 is a substantially planar video tape cassette 10, including generally a cassette base 12, a cassette cover 14, a left tape reel 16 and a right tape reel 18. Tape 19 is wound between the reels 16, 18. Each tape reel 16 and 18 includes a hub 20 and 22, an upper flange 24 and 26, and a lower flange 36 and 38, respectively. A window 28 allows the reels 16 and 18 to be seen. Reel leaf springs 29, 31 can also be seen biasing centrally the tape reels 16, 18, respectively.

The tape cassette 10 also includes a dust door 30 which is spring biased and pivotable between a first, closed position and a second, open position. This dust door 30, except for the features described below, is otherwise conventional. An example of such a dust door 30 is described in Assignee's U.S. Pat. No. 4,533,093, entitled "Tape Cassette Dust Door Spring Assembly and Method for Assembling Same."

The dust door 30 according to the present invention includes tape reel locking means 42 in the form of, e.g., a pair of projections 44 and 46. The projections 44, 46 are preferably formed integrally of the dust door 30 during molding thereof. The projections 44, 46, as can be seen in FIGS. 1-3, are substantially T-shaped in cross section, including a planar base member 48 connected to the dust door upper wall 32, and a perpendicular, planar extension member 50 protruding inwardly from the base member 48.

Each planar extension member 50 can have a beveled edge and a rounded corner, said features facilitating cooperation with the teeth 56 described below.

Openings 52, 54, formed at the front edge 34 of the cover 14, are also substantially T-shaped and receive the projections 44, 46, respectively, when the dust door 30 is moving between the first, closed position and the second, open position.

Each of the upper flanges 24, 26 of the tape reels 16, 18, respectively, includes a plurality of receptacles formed by teeth 56 formed circumferentially thereon. The teeth 56 are formed to cooperate with the perpendicular extension members 50.

Figure 2:
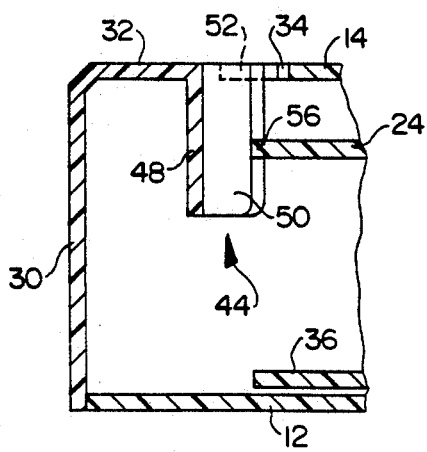
FIG. 2 is a side, cross-sectional view, taken along line 2—2 of FIG. 1, of one of the reel locks engaged with circumferential teeth of a tape reel upper flange, when the dust door is in the first, closed position.

FIG. 2 is a side cross-sectional view of the projection 44 engaged between two circumferential teeth 56 formed on the tape reel upper flange 24, when the dust door 30 is in the first, closed position. That is, the projections 44, 46 extend, when the dust door 30 is in the first, closed position, through the openings 52, 54 formed in a front edge 34 of the cassette cover 14 and are received between the teeth 56 formed on the circumference of the tape reel upper flanges 24 and 26.

The first, closed position of the dust door 30 illustrated by FIGS. 1 and 2 is characteristic of when the tape cassette 10 is not being operated by the tape player/recorder, e.g., during shipping, handling, storage, etc. In this position, the reel locking means 42 reliably keeps the tape reels 16, 18 from rotating, thereby preventing despooling.

In contrast, when the tape cassette 10 is loaded in a tape player/recorder, the player/recorder moves the dust door 30 from the first, closed position to the second, open position against the force of the dust door spring (not shown). In this regard, operation of the dust door 30 is the same as with a conventional, biased, pivoting dust door.

Figure 3:
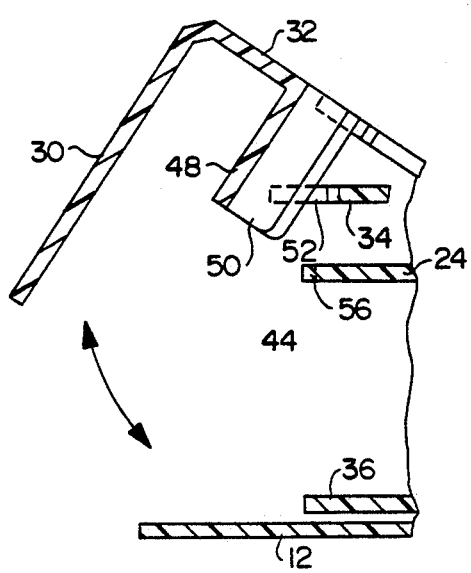
FIG. 3 is a side, cross-sectional view of one of the reel locks disengaged from the teeth on the tape reel upper flange circumference, when the dust door is in the second, open position.

As shown in FIG. 3, as the dust door 30 is opened, the projection 44 disengages from the teeth 56 on the tape reel 16, which allows the tape reels 16, 18 to freely rotate for feeding the tape 19 through the tape player/recorder.

As described above, a key to the present invention is that one spring now serves the purpose of closing the dust door and locking the hubs, in contrast to the at least two springs conventionally required, one of ordinary skill, of course, would realize that if the particular reels are intended to take a full load of tape, e.g., a T-90 tape cassette, the spring force of the dust door needed to effectively lock the reels may have to be greater than the spring force of the conventional dust door spring.

A significant benefit of this invention over the prior art is that the various walls/receptacles usually required at the rear, central area of the cassette, and the movable, multi-piece reel lock, as shown in U.S. Pat. Nos. 4,447,020 and 4,232,840, discussed above, or even the one piece tape reel described in U.S. Ser. No. 389,906 cited above, now U.S. Pat. No. 5,056,735 are no longer necessary. This minimizes mold design and saves raw materials. It is noted, however, that due to industry standards for a movable reel lock, an opening 58 may still be formed at the rear of the cassette base to allow the pin of the tape player/recorder free movement.

Further, by incorporating the reel locks into a conventional dust door, the overall number of parts of the cassette is reduced, there is no need to change in any way the standards set for the cassette or the tape player/recorder design, assembly is facilitated because, particularly, spring loading of a reel lock is eliminated, and operation is more reliable because there are no moving parts to this reel lock.

The above-described invention has been shown to be of the type intended for use in video players/recorders. However, the invention can be similarly applied to tape cassettes for use in audio or other recording and/or reproducing apparatus, if desired.

The foregoing is considered illustrative only of the principles of the invention. Further, since numerous modifications and changes will readily occur to those skilled in the art, it is not desired to limit the invention to the exact construction and operation shown and described. For example, although it has been described above that the upper flanges 24, 26 of the tape reels 16, 18 include the teeth 56, the lower flanges 36, 38 could include teeth. Further, although cooperating projection/teeth combinations are described, other types of cooperating arrangements could be used. Accordingly, all suitable modifications and equivalents may be resorted to that fall within the scope of the invention and the appended claims.

What is claimed is:

1. A video tape cassette to be received by a tape player/recorder, comprising:
   (a) a cover, including a recess formed in an edge thereof;

(b) a base mated with the cover;

(c) a tape reel mounted for biased rotation between the cover and base, said tape reel including a flange having an upper planar surface, a lower planar surface and an outer circumferential edge between the upper and lower planar surfaces on which is formed a plurality of receptacles extending outwardly; and (d) a biased dust door pivotable between a first, closed position and a second, open position, said dust door including a projection protruding outwardly from an edge thereof, wherein the projection passes through the recess formed in the cover edge, when the dust door is moved between the first position and the second position, and wherein the projection is received by one of said plurality of receptacles for preventing rotation of the tape reel, when the dust door is in the first, closed position.

2. The video tape cassette as recited in claim 1, wherein the projection includes a planar base member connected to the dust door and a perpendicular, planar extension member protruding inwardly from the base member.

3. The video tape cassette as recited in claim 2, wherein the extension member includes a beveled edge and a rounded corner.

4. The video tape cassette as recited in claim 1, wherein the flange is an upper flange of the tape reel.

5. A video tape cassette to be received by a tape player/recorder, comprising:

(a) a cover, including a pair of spaced recesses formed in an edge of the cover;

(b) a base mated with the cover;

(c) a pair of spaced tape reels mounted for biased rotation between the cover and base, each tape reel including a flange having an upper planar surface, a lower planar surface and an outer circumferential edge between the upper and lower planar surfaces on which is formed a plurality of teeth extending outwardly; and (d) a biased dust door pivotable between a first, closed position and a second, open position, said dust door including a pair of projections spaced to correspond to the spacing of the cover recesses and formed to protrude outwardly from an edge thereof, wherein the projections pass through the recesses formed in the cover edge, when the dust door is moved between the first position and the second position, and wherein the projections are received by one of said plurality of teeth for preventing rotation of the tape reels, when the dust door is in the first, closed position.

6. The video tape cassette as recited in claim 5, wherein each projection includes a planar base member connected to the dust door and a perpendicular, planar extension member protruding inwardly from the base member.

7. The video tape cassette as recited in claim 6, wherein each extension member includes a beveled edge and a rounded corner.

8. The video tape cassette as recited in claim 5, wherein the flange is an upper flange of the tape reel.

* * * * *